No. 768,527. PATENTED AUG. 23, 1904.
H. E. HOENIG & W. A. McCULLOUGH.
STEERING APPARATUS FOR AUTOMOBILES.
APPLICATION FILED NOV. 3, 1903.
NO MODEL.
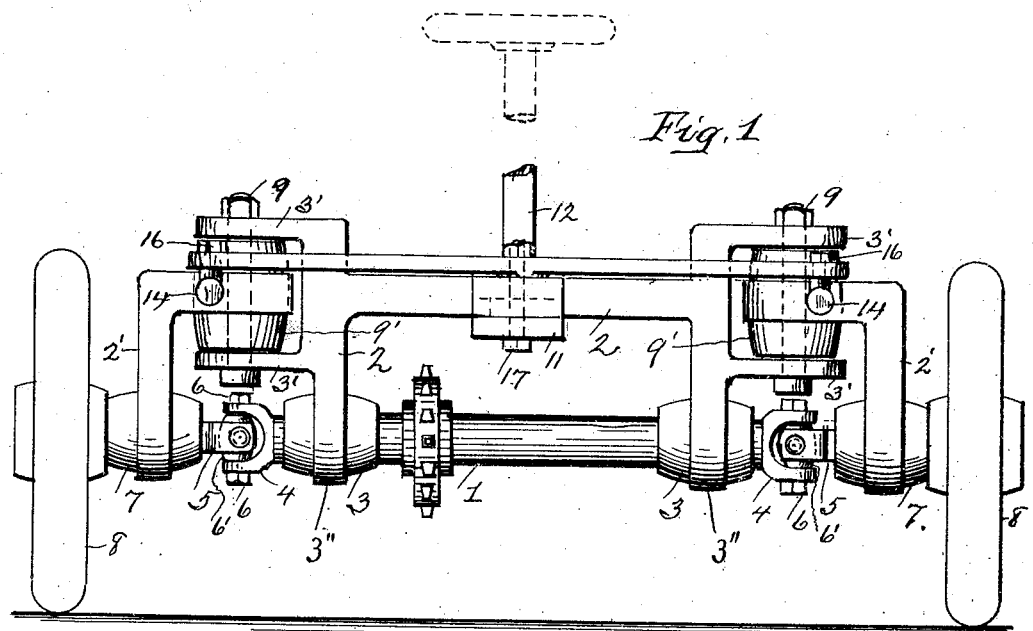
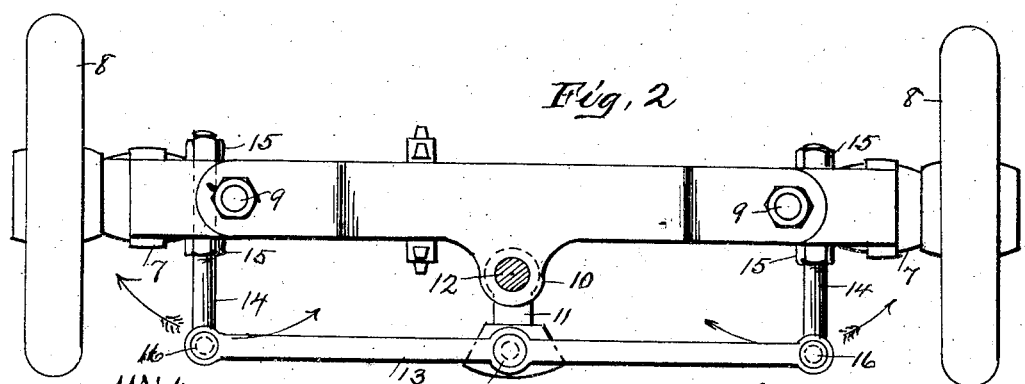

No. 768,527.

Patented August 23, 1904.

UNITED STATES PATENT OFFICE.

HARRY EDWARD HOENIG AND WALTER ALBERT McCULLOUGH, OF ROCHESTER, PENNSYLVANIA.

STEERING APPARATUS FOR AUTOMOBILES.

SPECIFICATION forming part of Letters Patent No. 768,527, dated August 23, 1904.

Application filed November 3, 1903. Serial No. 179,717. (No model.)

*To all whom it may concern:*

Be it known that we, HARRY EDWARD HOENIG and WALTER ALBERT McCULLOUGH, citizens of the United States, residing at Rochester, in the county of Beaver and State of Pennsylvania, have invented a new and useful Improvement in Steering Apparatus, of which the following is a specification.

This invention relates to an improved steering apparatus for automobiles; and it consists in the certain details of construction and combination of parts, as will be fully described hereinafter.

In the accompanying drawings, Figure 1 is a rear elevation of the front axle and gear, together with our improved steering apparatus, the same being constructed and arranged in accordance with our invention. Fig. 2 is a plan view of the same.

1 denotes the front axle of an automobile or other vehicle, the latter provided with a frame 2, which is formed with spaced horizontally-disposed supporting-brackets 3' 3', the lower of which are integral with and receive support from downwardly-extending brackets 3" 3", which are suitably bored to receive the bearings 3, through which passes the said axle 1. Secured to the ends of the axle are forked-shaped portions of the clevis 4, which, in connection with similar portions 5 of the wheel 8 and an inclosed sphere 6' and bolt 6, constitute a universal joint. The forked-shaped portions 5 are rigidly secured to the wheel 8, being first passed through bearings 7, received in suitable bored portions in the arms 2', now to be referred to. These arms 2' are of substantial L shape, the upper portions thereof being horizontally disposed and received by and secured to the bearings 9', which are interposed between the brackets 3' 3' and secured with respect thereto by virtue of bolts 9 passing through the brackets 3' 3' and through the bearing 9'.

Attached to and projecting through the bearings 9' are arms 14, as shown, being formed of a threaded shaft receiving nuts 15 thereon to retain the arm in predetermined position, this arm at its outer end bearing a vertical stud 16, extending upwardly at right angles thereto, and connecting-bar 13, by virtue of which simultaneous movement of the arms 14 and the wheels 8 may be accomplished.

Arranged at the middle of the frame 1 and projecting rearward therefrom is the bracket 10, in which is journaled a vertical shaft 12, the lower end of which has secured thereto a crank 11, which in turn is connected to the connecting-bar 13 by virtue of bolt 17. As shown in dotted lines in Fig. 1, the conventional type of steering-wheel is shown attached to this shaft 12, by means of which same may be revolved to actuate crank 11, connecting-bar 13, arms 14, and, through the medium of the said arms, wheels 8.

It will be seen by the above construction and arrangement of the parts that by turning the shaft 12 in either direction the wheels of the vehicle will be moved accordingly, the bearings 7 keeping the wheels in line and the universal joints allowing the same to move in the arc of a circle.

It is obvious that slight modifications and changes may be made in the details of construction without departing from the general spirit of the invention. Therefore we do not wish to confine ourselves to that shown and described.

Having thus described our invention, what we claim, and desire to secure by Letters Patent, is—

In a device of the type set forth, a frame having downwardly-extending brackets at its end extremities, extending below said frame, an axle journaled in said brackets, horizontally-arranged brackets formed integral with said downwardly-extending brackets and disposed above and below said frame, bearings journaled between said horizontal brackets and resting on the lower thereof, L-shaped arms secured to said bearings extending downwardly to aline with said axle, wheels supported in said L-shaped arms, a universal-joint connection between said wheels, and axle, and lying between said downwardly-extending bracket and said L-shaped arms, rods passed through the bearings and extending outwardly from the frame, said rods having threaded portions with nuts thereon bearing against opposite sides of the bearings, a connecting-bar secured to said rods, a bracket on
5 the frame, having a shaft therein, with a crank connected to said bar and said last-named frame-bracket.

In testimony whereof we have hereunto signed our names in the presence of two subscribing witnesses.

HARRY EDWARD HOENIG.
   WALTER ALBERT McCULLOUGH.

Witnesses:
 JOHN GROETZINGER,
 M. HUNTER.